United States Patent
Reyes et al.

(10) Patent No.: US 9,725,642 B2
(45) Date of Patent: Aug. 8, 2017

(54) COMPLEXATION OF CALCIUM IONS IN THE PRESENCE OF QUATERNIZED AMINE COMPOUNDS WHILE ACIDIZING A SUBTERRANEAN FORMATION

(71) Applicant: Halliburton Energy Services, Inc., Houston, TX (US)

(72) Inventors: Enrique Antonio Reyes, Houston, TX (US); Alyssa Lynn Smith, Houston, TX (US); Aaron M. Beuterbaugh, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 260 days.

(21) Appl. No.: 13/893,747

(22) Filed: May 14, 2013

(65) Prior Publication Data

US 2014/0342953 A1  Nov. 20, 2014

(51) Int. Cl.
*C09K 8/72* (2006.01)
*C09K 8/74* (2006.01)

(52) U.S. Cl.
CPC . *C09K 8/72* (2013.01); *C09K 8/74* (2013.01)

(58) Field of Classification Search
CPC ... C09K 8/74; C09K 8/72; C09K 8/86; C09K 8/52; C09K 8/528; C09K 8/78; C09K 8/845; C09K 2208/32; C09K 2208/30; C09K 8/508; C09K 8/68; C09K 2208/00; C09K 2208/18; C09K 2208/26; C09K 8/035; C09K 8/54; C09K 8/76; C09K 8/80; C09K 2208/12; C09K 2208/22; C09K 2208/28; C09K 8/512; C09K 8/536; C09K 8/572; C09K 8/575; C09K 8/58; C09K 8/582; C09K 8/584; C09K 8/588; C09K 8/703; Y10S 507/933; Y10S 507/936; Y10S 423/21; Y10S 507/903; Y10S 507/922; Y10S 507/923; Y10S 507/927; Y10S 507/928; Y10S 507/934; Y10S 507/939; Y10S 516/05; Y10S 516/06; Y10S 516/07; E21B 43/16
See application file for complete search history.

(56) References Cited

U.S. PATENT DOCUMENTS

| | | | |
|---|---|---|---|
| 4,669,545 A | 6/1987 | Slaugh | |
| 7,947,629 B2 | 5/2011 | Fuller | |
| 2004/0235677 A1* | 11/2004 | Nguyen | C09K 8/032 507/200 |
| 2006/0013798 A1* | 1/2006 | Henry | A61K 31/785 424/78.09 |
| 2008/0139412 A1* | 6/2008 | Fuller | C09K 8/52 507/219 |
| 2012/0097392 A1* | 4/2012 | Reyes | C02F 5/12 166/279 |

FOREIGN PATENT DOCUMENTS

WO   2005071038 A1   8/2005

OTHER PUBLICATIONS http://www.science.uwaterloo.ca/~cchieh/cact/applychem/alsilicate.html downloaded on Nov. 27, 2016.*
International Search Report and Written Opinion for PCT/US2014/037286 dated Sep. 26, 2014.

* cited by examiner

*Primary Examiner* — Kumar R Bhushan
(74) *Attorney, Agent, or Firm* — McDermott Will & Emery LLP

(57) ABSTRACT

Acidizing operations in subterranean formations that contain both a siliceous material and a source of calcium ions can often be problematic due to the generation of calcium-containing precipitates, particularly calcium fluoride. Methods for treating a subterranean formation can comprise: providing a treatment fluid having a pH ranging between about 1 and about 4.5 and comprising a chelating agent, hydrofluoric acid or a hydrofluoric acid-generating compound, and a compound having two or more quaternized amine groups; introducing the treatment fluid into a subterranean formation containing a siliceous material and a source of calcium ions; dissolving at least a portion of the siliceous material in the subterranean formation with the hydrofluoric acid or the hydrofluoric acid-generating compound; and complexing at least a portion of the calcium ions in the subterranean formation with the chelating agent.

10 Claims, 10 Drawing Sheets

COMPLEXATION OF CALCIUM IONS IN THE PRESENCE OF QUATERNIZED AMINE COMPOUNDS WHILE ACIDIZING A SUBTERRANEAN FORMATION

BACKGROUND

The present disclosure generally relates to acidizing subterranean formations, and, more specifically, to methods for mitigating the generation of calcium-containing precipitates during acidizing operations.

Treatment fluids can be used in a variety of subterranean treatment operations. Such treatment operations can include, without limitation, drilling operations, stimulation operations, production operations, sand control treatments, and the like. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid or a component thereof, unless otherwise specified herein. Illustrative treatment operations can include, for example, drilling operations, fracturing operations, gravel packing operations, acidizing operations, scale dissolution and removal operations, sand control operations, consolidation operations, and the like.

Acidizing operations may be used to stimulate a subterranean formation to increase production therefrom. During an acidizing operation, an acid-soluble material in the subterranean formation can be dissolved by one or more acids to expand existing flow pathways in the subterranean formation, to create new flow pathways in the subterranean formation, or to remove acid-soluble precipitation damage in the subterranean formation. The acid-soluble material being dissolved by the acid(s) can be part of the native formation matrix or can have been deliberately introduced into the subterranean formation in conjunction with a stimulation or like treatment operation (e.g., proppant or gravel particulates). Illustrative substances within the native formation matrix that may be dissolved by an acid include, but are not limited to, carbonates, silicates and aluminosilicates. Other substances can also be dissolved during the course of performing an acidizing operation, and the foregoing substances should not be considered to limit the scope of substances that may undergo acidization. As further discussed below, certain components dissolved during an acidizing operation can be problematic and possibly detrimental for future production from the subterranean formation.

Carbonate formations can contain minerals that comprise a carbonate anion (e.g., calcite (calcium carbonate) and dolomite (calcium magnesium carbonate)). When acidizing a carbonate formation, the acidity of the treatment fluid alone can be sufficient to solubilize the carbonate material by decomposing the carbonate anion to carbon dioxide and leeching a metal ion into the treatment fluid. Both mineral acids (e.g., hydrochloric acid) and organic acids (e.g., acetic and formic acids) can be used to treat a carbonate formation, often with similar degrees of success.

Siliceous formations can include minerals such as, for example, zeolites, clays, and feldspars. As used herein, the term "siliceous" refers to a substance having the characteristics of silica, including silicates and/or aluminosilicates. Most sandstone formations, for example, contain about 40% to about 98% sand quartz particles (i.e., silica), bonded together by various amounts of cementing materials, which may be siliceous in nature (e.g., aluminosilicates or other silicates) or non-siliceous in nature (e.g., carbonates, such as calcite). Acidizing a siliceous formation or a formation containing a siliceous material is thought to be considerably different than acidizing a carbonate formation. Specifically, the mineral and organic acids that can be effective for acidizing a carbonate formation may have little effect on a siliceous formation, since these acids do not effectively react with siliceous materials to affect their dissolution. In contrast, hydrofluoric acid, another mineral acid, can react very readily with siliceous materials to promote their dissolution. Oftentimes, a mineral acid or an organic acid can be used in conjunction with hydrofluoric acid to maintain a low pH state as the hydrofluoric acid becomes spent during dissolution of a siliceous material. The low pH state may promote initial silicon or aluminum dissolution and aid in maintaining these substances in a dissolved state. Moreover, the additional acid may also promote dissolution of non-siliceous materials in the subterranean formation as well.

Despite the advantages that can be realized by acidizing a siliceous formation, there are significant issues that can be encountered during such operations. Dissolved silicon and aluminum can sometimes react further, particularly in the presence of alkali metal ions, to produce damaging precipitates that can often be more detrimental for production than if the acidizing operation had not been performed in the first place. In addition, in subterranean formations containing both a siliceous material and a carbonate material, precipitation of calcium fluoride, a fairly insoluble salt, can also be exceedingly problematic. Moreover, calcium fluoride precipitation can decrease the quantity of fluoride ions that are available to solubilize the siliceous material. For these reasons, conventional acidizing operations have often been difficult to conduct in siliceous formations containing more than about 5% carbonate minerals.

The equilibrium solubility levels of silicon and aluminum usually depend upon one another, such that by maintaining high levels of dissolved aluminum during an acidizing operation, silicon dissolution can be promoted as well. Silicon and aluminum dissolution in a fluid can be promoted by fluoride ion complexation, and aluminum dissolution can also be promoted by chelation. By using a chelating agent to promote aluminum dissolution, fluoride ions can remain free to coordinate silicon and promote its dissolution.

Chelation of calcium ions has not typically been effective to suppress the precipitation of calcium fluoride during conventional acidizing operations. Without being bound by any theory or mechanism, it is believed that this difficulty is due to the high formation constants of most aluminum complexes relative to the corresponding calcium complexes and the different pH ranges at which these complexes most effectively form, thereby leaving insufficient amounts of chelating agent free for calcium ion complexation. As an alternative to chelation, one approach that has been used to address the co-presence of calcium ions and siliceous materials during acidizing operations has been to carry out an initial acidizing step to solubilize and remove a substantial portion of a carbonate material, but not an appreciable portion of a siliceous material, from a subterranean formation. Thereafter, an acidizing operation can be conducted with hydrofluoric acid to solubilize the siliceous material, often after conducting one or more flushing operations to remove a substantial portion of the calcium ions and/or alkali metal ions from the subterranean formation. These types of multi-step acidizing operations can be expensive, time-consuming and problematic to carry out. Moreover, it can be difficult to remove all of the calcium ions or alkali metal ions from the subterranean formation in this manner.

SUMMARY OF THE INVENTION

The present disclosure generally relates to acidizing subterranean formations, and, more specifically, to methods for mitigating the generation of calcium-containing precipitates during acidizing operations.

In some embodiments, the present disclosure provides methods comprising: providing a treatment fluid having a pH ranging between about 1 and about 4.5 and comprising: a chelating agent; hydrofluoric acid or a hydrofluoric acid-generating compound; and a compound having two or more quaternized amine groups; introducing the treatment fluid into a subterranean formation containing a siliceous material and a source of calcium ions; dissolving at least a portion of the siliceous material in the subterranean formation with the hydrofluoric acid or the hydrofluoric acid-generating compound; and complexing at least a portion of the calcium ions in the subterranean formation with the chelating agent.

In other embodiments, the present disclosure provides methods comprising: providing a treatment fluid comprising: a chelating agent; hydrofluoric acid or a hydrofluoric acid-generating compound; and a compound having two or more quaternized amine groups; introducing the treatment fluid into a subterranean formation containing a source of calcium ions; wherein the treatment fluid, the subterranean formation, or both contains alkali metal ions; and complexing at least a portion of the calcium ions in the subterranean formation with the chelating agent, without forming a $CaF_2$ precipitate, after introducing the treatment fluid into the subterranean formation.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combinations, and equivalents in form and function, as will occur to one having ordinary skill in the art and the benefit of this disclosure.

DETAILED DESCRIPTION

Figure 1:
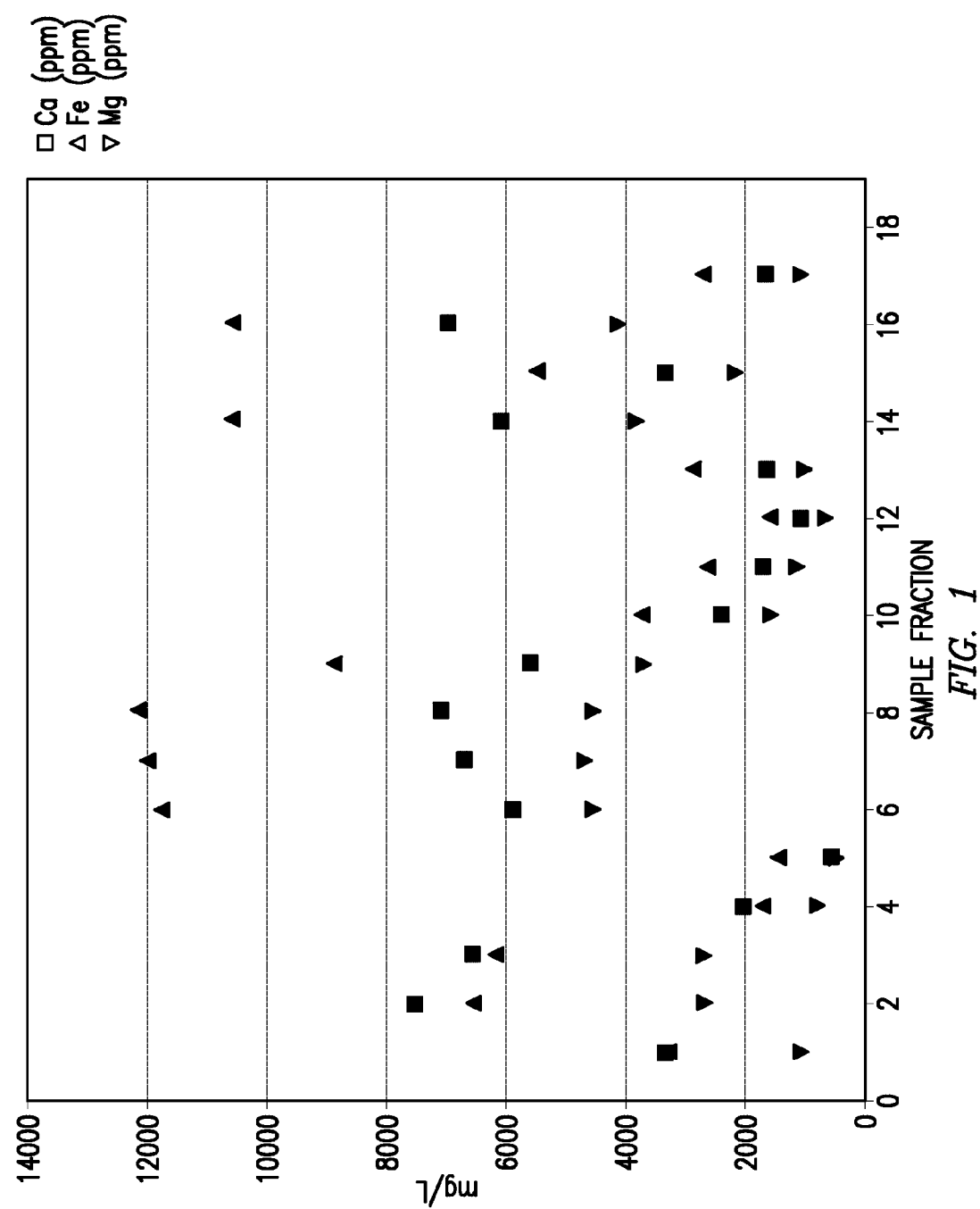
FIGS. 1-3 show illustrative elution plots at 200° F. of a Bandera core eluted with 0.6 M aqueous methylglycine diacetic acid (MGDA) (Fluid 1), followed by two applications 0.6 M aqueous MGDA also containing 2% ammonium bifluoride and 5% CLA-WEB™ (Fluid 2).

The present disclosure generally relates to acidizing subterranean formations, and, more specifically, to methods for mitigating the generation of calcium-containing precipitates during acidizing operations.

As discussed above, utilization of a chelating agent during acidizing operations can have a number of benefits, particularly when acidizing a subterranean formation containing a siliceous material. Specifically, a chelating agent may be used to complex aluminum ions leeched from a siliceous material during acidizing operations, thereby lowering the incidence of damaging silicon and/or aluminum precipitation. The present inventors recognized that if calcium ions could be effectively complexed in the presence of aluminum ions, further benefits could be recognized during acidizing operations. Specifically, the inventors recognized that by complexing calcium ions, the likelihood of damaging calcium fluoride precipitation may be lessened, while leaving fluoride ions free for maintaining silicon in a dissolved state. By effectively complexing calcium ions, acidizing operations may be more effectively conducted in subterranean formations containing both a siliceous material and a carbonate material, thereby addressing a need not easily met in the art at present. This feature can be advantageous in terms of cost, complexity and time savings over presently used acidizing techniques, in which a carbonate material is removed from a subterranean formation prior to removal of a siliceous material in order to avoid calcium fluoride precipitation. Moreover, aluminum ions can also be complexed, thereby realizing the benefits of their sequestration as well.

When acidizing a subterranean formation containing both a siliceous material and a carbonate material, the chelating agent and the hydrofluoric acid may be present in the same treatment fluid, thereby allowing single-stage or fewer-stage treatments to be conducted. This feature can considerably reduce the cost and complexity of conducting an acidizing operation. However, if desired, staged acidizing operations with a chelating agent may be conducted as well. In this regard, an initial acidizing stage may be conducted with a chelating agent to dissolve a carbonate material and sequester its calcium ions. Thereafter, a subsequent acidization stage with hydrofluoric acid may be used to dissolve a siliceous material. A chelating agent may also be present when the acidization with hydrofluoric acid takes place, and it may be the same as or different than the chelating agent used to promote dissolution of the carbonate material. For example, in some embodiments, different chelating agents may be used, where one chelating agent has better selectivity for calcium complexation than does the other. In other embodiments, a single chelating agent may be used in an amount sufficient to complex both aluminum ions and calcium ions without regard to selectivity. Depending on the relative amounts of aluminum and calcium in a subterranean formation, one of ordinary skill in the art can determine whether to conduct the acidizing operations described herein in a single stage or in multiple stages, using one or more chelating agents. Other variables may need to be taken into consideration as well.

As described above, alkali metal ions can also be problematic when acidizing subterranean formations containing a siliceous material. The term "Group 1 metal ions," referring to Group 1 of the Periodic Table, and the term "alkali metal ions" will be used synonymously herein. In commonly owned U.S. patent application Ser. No. 13/558,158, filed on Aug. 17, 2012 and incorporated herein by reference in its entirety, it was disclosed that compounds containing two or more quaternized amine groups may mitigate the occurrence of precipitates related to alkali metal ions. Without being bound by any theory or mechanism, it is believed that such compounds may form an ion pair or other complex with dissolved aluminum or silicon, while the aluminum is coordinated by a chelating agent and the silicon is coordinated to fluoride or other ions (e.g., hydronium and/or aqua ions), thereby limiting the approach of alkali metal ions thereto and the likelihood of precipitation. In some cases, such compounds may also promote the formation of particulates that are sufficiently small to be fluidly mobile and easily produced from a subterranean formation, thereby limiting the effects of precipitation damage. Adsorption/desorption properties of the ion pair or complex may be altered as well. In various embodiments, alkali metals may be found in the treatment fluids described herein, and/or in the subterranean formation undergoing treatment.

In the presence of compounds containing two or more quaternized amine groups, similar benefits to those described above may be realized in relation to the suppression of calcium fluoride precipitation. Remaining unbound by theory or mechanism, it is believed that compounds containing two or more quaternized amine groups may surprisingly promote the complexation of calcium with a chelating agent, even in the presence of aluminum, such that little to no calcium fluoride precipitation occurs.

In further regard to alkali metal ions, a number of advantages may be realized through using a compound containing two or more quaternized amine groups in conjunction with an acidizing operation. A leading advantage of using such compounds in conjunction with an acidizing operation is that significantly fewer precautions may need to be taken to exclude alkali metal ions from the subterranean environment, including reducing or eliminating costly pre-flush treatments with $NH_4^+$-containing fluids. Likewise, there may be more tolerance for alkali metal ions in the carrier fluids used for treatment fluid formulation, thereby allowing saltier and potentially less costly water sources to be used. In addition, such compounds may allow alkali metal salts of chelating agents to be employed in lieu of the free acid or ammonium salt forms, which may be unknown, not commercially available, or expensive. By expanding the breadth of chelating agents that may be effectively used, it may be possible to select chelating agents that are biodegradable, thereby improving the environmental profile of the acidizing operation. A further discussion of biodegradable chelating agents follows hereinbelow.

In some embodiments, methods described herein can comprise: providing a treatment fluid comprising: a chelating agent, hydrofluoric acid or a hydrofluoric acid-generating compound, and a compound having two or more quaternized amine groups; introducing the treatment fluid into a subterranean formation containing a source of calcium ions; wherein the treatment fluid, the subterranean formation, or both contains alkali metal ions; and complexing at least a portion of the calcium ions in the subterranean formation with the chelating agent, without forming a $CaF_2$ precipitate, after introducing the treatment fluid into the subterranean formation.

In some embodiments, methods described herein can comprise: providing a treatment fluid comprising: a chelating agent, hydrofluoric acid or a hydrofluoric acid-generating compound, and a compound having two or more quaternized amine groups; introducing the treatment fluid into a subterranean formation containing a siliceous material and a source of calcium ions; and complexing at least a portion of the calcium ions in the subterranean formation with the chelating agent. In some embodiments, a $CaF_2$ precipitate is not formed after introducing the treatment fluid into the subterranean formation. In some embodiments, the methods can further comprise dissolving at least a portion of the siliceous material in the subterranean formation with the hydrofluoric acid or the hydrofluoric acid-generating compound.

In various embodiments, the treatment fluid can have a pH that is suitable for solubilizing a carbonate material in the subterranean formation. In some embodiments, the treatment fluids described herein can have a pH ranging between about 1 and about 6. In other embodiments, the treatment fluids can have a pH ranging between about 1 and about 4.5. In still other embodiments, the treatment fluids can have a pH ranging between about 1 and about 3. One of ordinary skill in the art will be able to determine an appropriate pH for a treatment fluid to be used in conjunction with a particular acidizing operation given the benefit of this disclosure. Factors that may be taken into account in determining a suitable pH of a treatment fluid include, for example, the composition of the subterranean formation and the desired acidizing rate. Moreover, one of ordinary skill in the art will further recognize appropriate pH ranges at which particular chelating agents can be expected to actively function in coordinating metal ions, particularly calcium ions, based upon the pKa values of the carboxylic acid groups in the chelating agent. Although calcium ion complexation is typically thought to be more effective at higher pH values (e.g., above about 6), effective chelation can still be realized at pH values below 6, particularly at pH values ranging between about 1 and about 4.5. Within this pH range, more vigorous acidizing can take place due to the stronger acid strength. As described herein, calcium fluoride precipitation can be problematic in the presence of excess fluoride ions, but this risk may be reduced within the above pH ranges through utilization of suitable chelating agents and compounds having two or more quaternized amine groups to improve the complexation of calcium ions and/or to limit the precipitation of calcium fluoride.

In various embodiments, the treatment fluids described herein can be used in acidizing a subterranean formation that comprises a carbonate material such as, for example, calcium carbonate, calcium magnesium carbonate, or iron carbonate. In some embodiments, the treatment fluids described herein can be used in acidizing a subterranean formation that comprises a siliceous material such as, for example, silicates or aluminosilicates. In further embodiments, the treatment fluids described herein can be used in acidizing a subterranean formation that comprises both a carbonate material and a siliceous material. More generally, in some embodiments, the treatment fluids described herein can be used in acidizing a subterranean formation that comprises a source of calcium ions and a siliceous material. Illustrative sources of calcium ions can include, for example, calcite (i.e., calcium carbonate), dolomite (i.e., calcium magnesium carbonate), calcium sulfate, calcium chloride, or any combination thereof. Illustrative siliceous materials can include, for example, silica, quartz, feldspars, aluminosilicates, clays or any combination thereof. Aluminosilicates that may be present include clays (including mixed layer and swelling clays), zeolites, kaolinite, illite, chlorite, bentonite, and feldspars, for example. The carbonate material and/or the siliceous material may be natively present in the subterranean formation, or the material(s) may have been previously introduced into the subterranean formation (e.g., during a prior stimulation operation.)

In some embodiments, methods described herein can comprise: providing a treatment fluid having a pH ranging between about 1 and about 4.5 and comprising: a chelating agent, hydrofluoric acid or a hydrofluoric acid-generating compound, and a compound having two or more quaternized amine groups; introducing the treatment fluid into a subterranean formation containing a siliceous material and a source of calcium ions; dissolving at least a portion of the siliceous material in the subterranean formation with the hydrofluoric acid or the hydrofluoric acid-generating compound; and complexing at least a portion of the calcium ions in the subterranean formation with the chelating agent.

In some embodiments, the treatment fluids described herein may comprise an aqueous carrier fluid as their continuous phase. Suitable aqueous carrier fluids may include, for example, fresh water, acidified water, salt water, seawater, brine (e.g., a saturated salt solution), or an aqueous salt solution (e.g., a non-saturated salt solution). Aqueous carrier fluids may be obtained from any suitable source. In some embodiments, the treatment fluids described herein may comprise an aqueous carrier fluid that is substantially free of alkali metal ions or contains as low a concentration of alkali metal ions as attainable at a reasonable cost. In some embodiments, an aqueous carrier fluid may comprise an ammonium salt such as, for example, ammonium chloride. Choice of a low salt, salt-substituted, or salt-free aqueous carrier fluid may allow a lower concentration of quaternized amine compound to be present in the treatment fluid, allow saltier subterranean formations to be treated, and/or permit greater quantities of alkali metal salts of chelating agents to be used. In other embodiments described herein, the treatment fluid may comprise a carrier fluid that contains alkali metal ions (i.e., contains an alkali metal salt). As described herein, the presence of compounds containing two or more quaternized amine groups may allow greater levity to be realized in choosing an aqueous carrier fluid for the treatment fluid than would otherwise be possible. Given the benefit of the present disclosure, one of ordinary skill in the art will be able to determine an acceptable working level of alkali metal ions that may be present in an aqueous carrier fluid to be used for formulating the treatment fluids described herein.

In some or other embodiments described herein, the treatment fluid may comprise an organic solvent, such as hydrocarbons, for example, as at least a portion of its continuous phase.

In various embodiments, compounds having two or more quaternized amine groups may be included in the treatment fluids described herein. In some embodiments, 2 quaternized amine groups may be present (i.e., a bis-quaternary ammonium compound). In other various embodiments, 3 quaternized amine groups, or 4 quaternized amine groups, or 5 quaternized amine groups, or 6 quaternized amine groups, or 7 quaternized amine groups, or 8 quaternized amine groups, or 9 quaternized amine groups, or 10 quaternized amine groups may be present. In some embodiments, the compound having two or more quaternized amine groups may comprise a polymeric compound comprising a plurality of quaternized amine groups.

In some embodiments, the compound having two or more quaternized amine groups may comprise a bis-quaternary ammonium compound. In some embodiments, the bis-quaternary ammonium compound may have a structure of

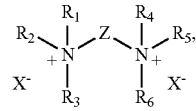

in which $R_1$-$R_6$ each comprise a carbon-containing group comprising 1 to about 20 carbon atoms, or 1 to about 10 carbon atoms, or 1 to about 6 carbon atoms; Z comprises a linker moiety comprising two or more atoms; and X is an anion. $R_1$-$R_6$ may be the same or different. In some embodiments, $R_1$-$R_6$ may be selected from the group consisting of alkyl, aryl, and cycloalkyl, any of which may optionally be unsaturated, branched and/or contain heteroatom substitution, if desired. Heteroatoms that may be present include, for example, O and N. In some embodiments, Z may comprise a carbon chain or a heteroatom-containing carbon chain, where the heteroatom may again be O or N, for example. In some embodiments, Z may comprise a linker moiety such as, for example, —$CH(R_7)CH_2$—, —$CH(OR_7)CH_2$—, —$CH(NR_7R_8)CH_2$—, —$CH(R_7)CH_2CH_2$—, —$CH_2CH(R_7)CH_2$—, —$CH(OR_7)CH_2CH_2$—, —$CH(NR_7R_8)CH_2CH_2$—, —$CH_2CH(OR_7)CH_2$—, or —$CH_2CH(NR_7R_8)CH_2$—, where $R_7$ and $R_8$ are independently selected from H or a carbon-containing group comprising 1 to about 20 carbon atoms, or 1 to about 10 carbon atoms, or 1 to about 6 carbon atoms. In some embodiments, $R_7$ and $R_8$ may be selected from the group consisting of alkyl, aryl, and cycloalkyl, any of which may optionally be unsaturated, branched and/or contain heteroatom substitution. Suitable anions $X^-$ that may balance charge in the bis-quaternary ammonium compounds may include, for example, fluoride, chloride, bromide, iodide; organic anions such as formate, acetate, toluenesulfonate, and methanesulfonate; sulfate, and nitrate.

Illustrative bis-quaternary ammonium compounds that may be used in the embodiments described herein are further set forth in United States Patent Application Publications 2004/0235677, 2006/0013798, and 2010/0311622, each of which is incorporated herein by reference in its entirety. One example of a bis-quaternary ammonium compound formulation that can be suitable for use in the embodiments described herein is CLA-WEB™, which is available through Halliburton Energy Services, Inc. (Houston, Tex.).

In various embodiments, the compound having two or more quaternized amine groups may comprise at least about 1 wt. % of the treatment fluid used in conjunction with acidizing the subterranean formation. In some or other embodiments, the compound having two or more quaternized amine groups may comprise at least about 5 wt. % of the treatment fluid, or at least about 10 wt. % of the treatment fluid, or at least about 20 wt. % of the treatment fluid, or at least about 40 wt. % of the treatment fluid. In some embodiments, the compound having two or more quaternized amine groups may comprise between about 1 wt. % and about 40 wt. % of the treatment fluid. In some or other embodiments, the compound having two or more quaternized amine groups may comprise between about 1 wt. % and about 20 wt. % of the treatment fluid, or between about 2 wt. % and about 15 wt. % of the treatment fluid, or between about 5 wt. % and about 10 wt. % of the treatment fluid.

In some embodiments, the treatment fluids described herein may include an acid or an acid-generating compound. The acid or acid-generating compound may be a mineral acid, an organic acid or any combination thereof. Suitable mineral acids may include, for example, hydrochloric acid, hydrofluoric acid and the like. Suitable organic acids may include, for example, formic acid, acetic acid, chloroacetic acid, dichloroacetic acid, trichloroacetic acid, methanesulfonic acid and the like. In some embodiments, hydrofluoric acid may be present in the treatment fluids described herein in combination with an acid-generating compound or another acid, such as hydrochloric acid or an organic acid, for example. Use of hydrofluoric acid in combination with another acid or an acid-generating compound may help maintain the pH of the treatment fluid in a desired range as the hydrofluoric acid becomes spent. For example, the acid or acid-generating compound may be present in the treatment fluid in a quantity sufficient to maintain the pH of the treatment fluid within the ranges set forth above. In other embodiments, however, hydrofluoric acid may be the only acid present, other than an acid comprising the chelating agent.

Examples of suitable acid-generating compounds may include, for example, esters, aliphatic polyesters, orthoesters, poly(orthoesters), poly(lactides), poly(glycolides), poly(ϵ-caprolactones), poly(hydroxybutyrates), poly(anhydrides), ethylene glycol monoformate, ethylene glycol diformate, diethylene glycol diformate, glyceryl monoformate, glyceryl diformate, glyceryl triformate, triethylene glycol diformate, and formate esters of pentaerythritol.

In various embodiments, the treatment fluids described herein may comprise hydrofluoric acid or a hydrofluoric acid generating compound. Examples of suitable hydrofluoric acid-generating compounds may include, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, boron trifluoride acetonitrile complex, boron trifluoride acetic acid complex, boron trifluoride dimethyl ether complex, boron trifluoride diethyl ether complex, boron trifluoride dipropyl ether complex, boron trifluoride dibutyl ether complex, boron trifluoride t-butyl methyl ether complex, boron trifluoride phosphoric acid complex, boron trifluoride dihydrate, boron trifluoride methanol complex, boron trifluoride ethanol complex, boron trifluoride propanol complex, boron trifluoride isopropanol complex, boron trifluoride phenol complex, boron trifluoride propionic acid complex, boron trifluoride tetrahydrofuran complex, boron trifluoride piperidine complex, boron trifluoride ethylamine complex, boron trifluoride methylamine complex, boron trifluoride triethanolamine complex, polyvinylammonium fluoride, polyvinylpyridinium fluoride, pyridinium fluoride, imidazolium fluoride, ammonium fluoride, ammonium bifluoride, tetrafluoroborate salts, hexafluoroantimonate salts, hexafluorophosphate salts, bifluoride salts, and any combination thereof.

When used, a hydrofluoric acid-generating compound can be present in the treatment fluids described herein in an amount ranging between about 0.1% to about 20% of the acidizing fluid by weight. In other embodiments, an amount of the hydrofluoric acid-generating compound can range between about 0.5% to about 10% of the treatment fluid by weight or between about 0.5% to about 8% of the treatment fluid by weight. Hydrofluoric acid may be present in the treatment fluids in similar concentration ranges. In various embodiments, the hydrofluoric acid concentration may range between about 0.1 wt. % and about 20 wt. % of the treatment fluid, or between about 0.15 wt. % and about 15 wt. % of the treatment fluid, or between about 0.2 wt. % and about 10 wt. % of the treatment fluid, or between about 0.5 wt. % and about 8 wt. % of the treatment fluid. Given the benefit of the present disclosure, one of ordinary skill in the art will be able to choose an appropriate hydrofluoric acid source and amount thereof to include in a treatment fluid intended for a particular subterranean operation.

In various embodiments, the treatment fluids described herein may comprise a chelating agent, and the methods described herein may comprise complexing a metal ion (e.g., a calcium ion and/or an aluminum ion) in the subterranean formation with the chelating agent. The metal ion may be produced by a reaction of a surface in the subterranean formation with an acid, or the chelating agent may react directly with the surface to affect dissolution of the metal ion. As described above, inclusion of a chelating agent in the treatment fluid and complexation of a metal ion therewith may be desirable to discourage precipitation in the subterranean formation.

In some embodiments, traditional chelating agents such as, for example, ethylenediaminetetraacetic acid (EDTA), propylenediaminetetraacetic acid (PDTA), nitrilotriacetic acid (NTA), N-(2-hydroxyethyl)ethylenediaminetriacetic acid (HEDTA), diethylenetriaminepentaacetic acid (DTPA), hydroxyethyliminodiacetic acid (HEIDA), cyclohexylenediaminetetraacetic acid (CDTA), diphenylaminesulfonic acid (DPAS), ethylenediaminedi(o-hydroxyphenylacetic) acid (EDDHA), glucoheptonic acid, gluconic acid, citric acid, any salt thereof, any derivative thereof, or the like may be included in the treatment fluids described herein.

In some or other embodiments, a biodegradable chelating agent may be included in the treatment fluids described herein. As used herein, the term "biodegradable" refers to a substance that can be broken down by exposure to environmental conditions including native or non-native microbes, sunlight, air, heat, and the like. Use of the term "biodegradable" does not imply a particular degree of biodegradability, mechanism of biodegradability, or a specified biodegradation half-life. Suitable biodegradable chelating agents may include, for example, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxy)ethyl]glycine (BCA6), N-bis[2-(1,2-dicarboxyethoxy)ethyl]aspartic acid (BCA5), N-bis[2-(1,2-dicarboxyethoxy)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyl-iminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl)aspartic acid, N-[2-(3-hydroxysuccinyl)]-L-serine, aspartic acid-N, N-diacetic acid, aspartic acid-N-monoacetic acid, any salt thereof, any derivative thereof, or any combination thereof. Particularly suitable biodegradable chelating agents that may be used in the treatment fluids described herein include, for example, MGDA, GLDA, EDDS and β-ADA.

In some or other embodiments, suitable chelating agents can include hydroxamates, as described in commonly owned U.S. patent application Ser. No. 13/663,825, filed on Oct. 30, 2012 and incorporated herein by reference in its entirety. In some or other embodiments, suitable chelating agents can include pyridinecarboxylic acids, as described in commonly owned U.S. patent application Ser. No. 13/837,090, filed on Apr. 3, 2013 and incorporated herein by reference in its entirety.

In some embodiments, the chelating agent may comprise the neutral form of the chelating agent. In other embodiments, the chelating agent may comprise a salt form of the chelating agent, including an alkali metal salt of the chelating agent. Other salt forms of the chelating agent may also be used and include, for example, an ammonium salt form or a quaternary ammonium salt form, if available.

In some embodiments, the concentration of the chelating agent in the treatment fluid may range between about 0.1% to about 40% of the treatment fluid by weight, or between about 0.1% to about 5% of the treatment fluid by weight, or between about 1% to about 10% of the treatment fluid by weight, or between about 5% to about 15% of the treatment fluid by weight, or between about 0.5% to about 5% of the treatment fluid by weight, or between about 10% to about 25% of the treatment fluid by weight, or between about 10% to about 40% of the treatment fluid by weight.

In some embodiments, the treatment fluids described herein may further comprise a silica scale control additive. As used herein, the term "silica scale control additive" will refer to any substance capable of suppressing silica scale build-up by increasing the solubility of dissolved silicon, inhibiting polymer chain propagation of dissolved silicon to produce precipitates, and/or decreasing the size and/or quantity of precipitates formed from dissolved silicon. Utilization of a silica scale control additive in combination with metal ion complexation provided by a chelating agent may beneficially permit a greater level of dissolved silicon to be realized than is possible through metal ion complexation alone. Suitable silica scale control additives may include, for example, phosphonates, aminocarboxylic acids, polyaminocarboxylic acids, polyalkyleneimines (e.g., polyethyleneimine), polyvinylamines, polyallylamines, polyallyldimethylammonium chloride, polyaminoamide dendrimers, any derivative thereof, and any combination thereof. Illustrative commercially available silica scale control additives include, for example, ACUMER 5000 (Rohm and Hass), and CLA-STA® XP and CLA-STA® FS (Halliburton Energy Services, Inc.). Other suitable silica scale control additives may include ortho-dihydroxybenzene compounds, such as tannic acid, for example, as described in commonly owned United States Patent Application Publication 2012/0145401, which is incorporated herein by reference in its entirety.

In some embodiments, the treatment fluids described herein may further comprise a silicate complexing agent, such as a functionalized pyridine compound, as described in commonly owned U.S. patent application Ser. No. 13/444,883, filed on Apr. 12, 2012 and incorporated herein by reference in its entirety.

In some embodiments, treatment fluids described herein may further comprise an alkali metal complexing agent, such as a crown ether, azacrown ether, or pseudocrown ether, as described in commonly owned U.S. patent application Ser. No. 13/444,897, filed on Apr. 12, 2012, and incorporated herein by reference in its entirety.

In further embodiments, the treatment fluids described herein may further comprise any number of additives that are commonly used in downhole operations including, for example, surfactants, gel stabilizers, anti-oxidants, polymer degradation prevention additives, relative permeability modifiers, scale inhibitors, corrosion inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, breakers, friction reducers, bridging agents, viscosifiers, weighting agents, solubilizers, pH control agents (e.g., buffers), hydrate inhibitors, consolidating agents, bactericides, catalysts, clay stabilizers, breakers, delayed release breakers, and the like. Combinations of these additives can be used as well. Given the benefit of the present disclosure, one of ordinary skill in the art will be able to formulate a treatment fluid having properties suitable for a given application.

In various embodiments, the treatment fluids described herein may be used in conjunction with various downhole operations. In some embodiments, the treatment fluids described herein may be used in conjunction with a stimulation operation conducted in a subterranean formation. In some embodiments, the stimulation operation can comprise a fracturing operation. In some or other embodiments, the stimulation operation can comprise an acidizing operation. In some embodiments, the treatment fluids described herein may be used in conjunction with a remediation operation conducted in a subterranean formation. Each of the foregoing treatment operations is discussed in more detail hereinbelow.

In some embodiments, the treatment fluids may be used to treat a proppant pack or a gravel pack in a subterranean formation in order to increase its permeability. In some embodiments, the treatment fluids may be used to treat a fracture in a subterranean formation in order to increase its permeability. In some embodiments, the treatment fluids described herein may be used in the course of creating or extending a fracture in a subterranean formation by introducing the treatment fluid at or above the fracture gradient of the subterranean formation.

In some embodiments, the treatment fluids may be used to remediate a subterranean formation that has precipitation or accumulation damage therein. As used herein, the term "precipitation or accumulation damage" refers to a material that has been dissolved in a subterranean formation and deposited elsewhere within the subterranean formation, optionally after undergoing a further reaction. That is, the treatment fluids described herein may be used to dissolve the various components of such damage in order to increase the permeability of the subterranean formation, thereby leading to the possibility of increased production. The precipitation or accumulation damage in the subterranean formation may result from any source, which may include another stimulation operation.

In some embodiments, the treatment fluids described herein may be used in conjunction with drilling a wellbore penetrating a subterranean formation. For example, when used during drilling, the treatment fluids may desirably leave the subterranean formation conditioned with chelating agent so that calcium fluoride precipitation can be subsequently mitigated at a later time. It is to be recognized, however, that the treatment fluids may also be used for proactive treatment of a subterranean formation at points in time other than in the drilling stage.

To facilitate a better understanding of the present invention, the following examples of preferred or representative embodiments are given. In no way should the following examples be read to limit, or to define, the scope of the invention.

EXAMPLES

Standard sandstone core samples from the Bandera outcrop were obtained for testing. The Bandera core samples consisted of thinly laminated, well-sorted micaceous sediments containing large amounts of carbonates, including substantial quantities of dolomite, kaolinite and illite. Its initial porosity ranged from 9-14% and the pore volume was 50 mL. The mineralogical analysis of the Bandera core is shown in Table 1.

TABLE 1

| Component | Bandera Core Percent Composition |
| --- | --- |
| Quartz | 62% |
| Na feldspar | 14% |
| K feldspar | 0% |
| Calcite | 1% |
| Dolomite | 14% |
| Kaolinite | 4% |
| Illite/Mica | 5% |
| Chlorite | 0% |

The core was placed in a rubber sleeve under a radial confining pressure of 2000 psi and at a back pressure of 800 psi in the direction opposite to the fluid flow. Further details of the flow testing conditions are provided in each example below. Samples from core flow testing were collected for elemental analyses by ICP-AES. The samples were allowed to stand for a period of time and then acidified with 2% $HNO_3$ prior to analysis. The pH of each sample fraction was measured using a HF-resistant probe, which was calibrated against certified buffers (pH values of 1.68, 4.01 and 7.0).

Example 1: Treatment of a Bandera Core at 200° F. Using MGDA and a Bis-Quaternary Ammonium Compound Treatment of the Bandera core was carried out in two stages, first using Fluid 1, a 0.6 M MGDA aqueous solution (pH=2), and second using Fluid 2, an aqueous solution that was 0.6 M in MGDA and also contained 2% ammonium bifluoride and 5% CLA-WEB™ (pH=2.5). Two applications of Fluid 2 were introduced to the core sample, each being separated by a 7% aqueous KCl flush. An initial pre-flush of the core was also conducted with 7% aqueous KCl and after each treatment stage. The testing conditions, flow rates and flow directions are summarized in Table 2 below.

TABLE 2

| Treatment Stage | Flow Direction | Pore Volumes Applied | Flow Rate (mL/min) |
| --- | --- | --- | --- |
| 7% KCl | Forward | 11 | 3 |
| 7% KCl | Reverse | 5.7 | 3 |
| 7% KCl | Reverse | 1.7 | 3 |
| Fluid 1 | Reverse | 10 | 2 |
| 7% KCl | Reverse | 9 | 3 |
| 7% KCl | Forward | 5 | 3 |
| Fluid 2 | Reverse | 5 | 2 |

TABLE 2-continued

| Treatment Stage | Flow Direction | Pore Volumes Applied | Flow Rate (mL/min) |
| --- | --- | --- | --- |
| 7% KCl | Reverse | 9 | 3 |
| 7% KCl | Forward | 8.5 | 3 |
| 7% KCl | Forward | 1.5 | 3 |
| Fluid 2 | Reverse | 5 | 2 |
| 7% KCl | Reverse | 9 | 3 |
| 7% KCl | Forward | 1.4 | 5 |
| 7% KCl | Forward | 6 | 3 |
| 7% KCl | Reverse | 9 | 3 |

Figure 2:
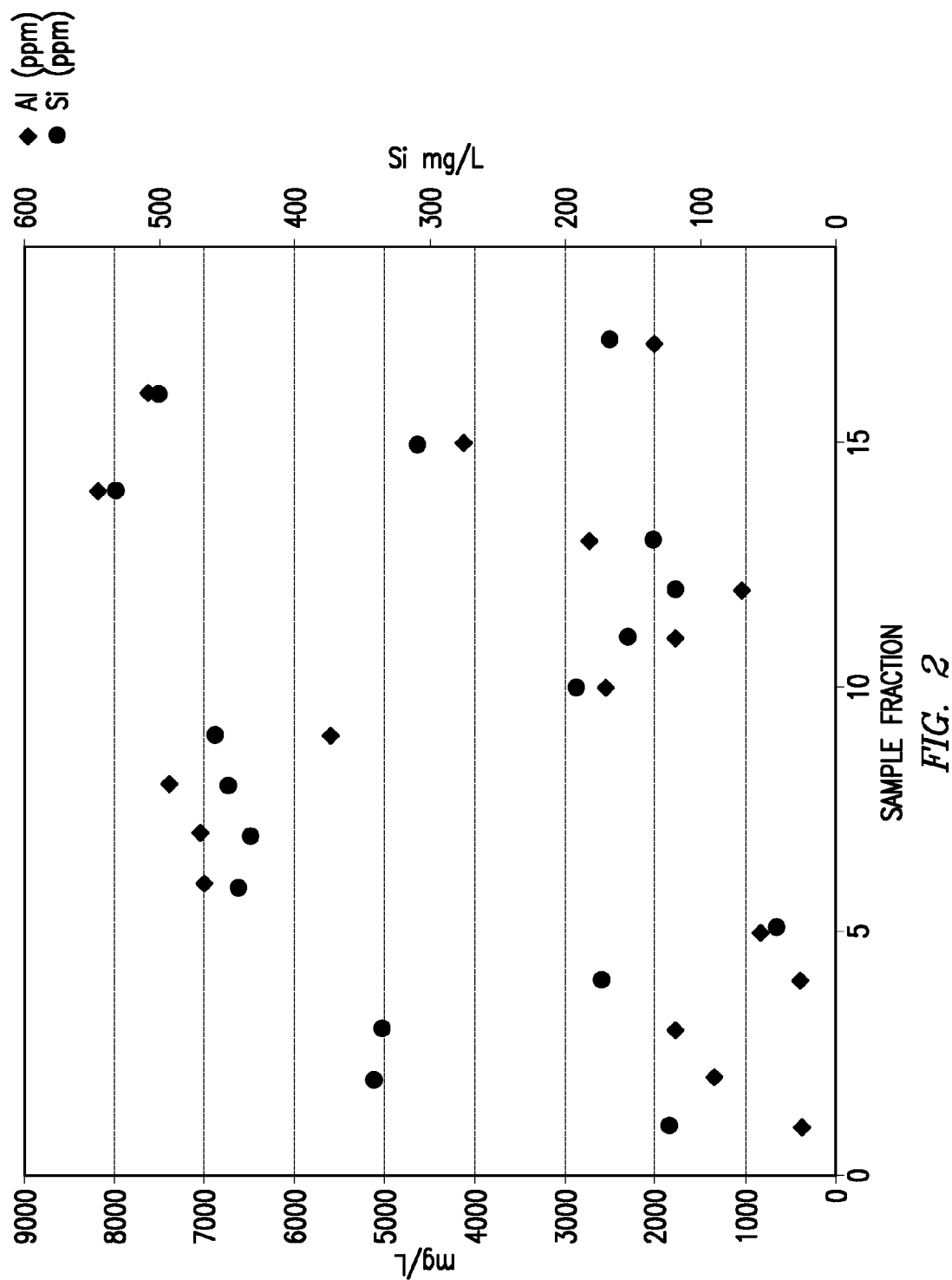
Figure 3:
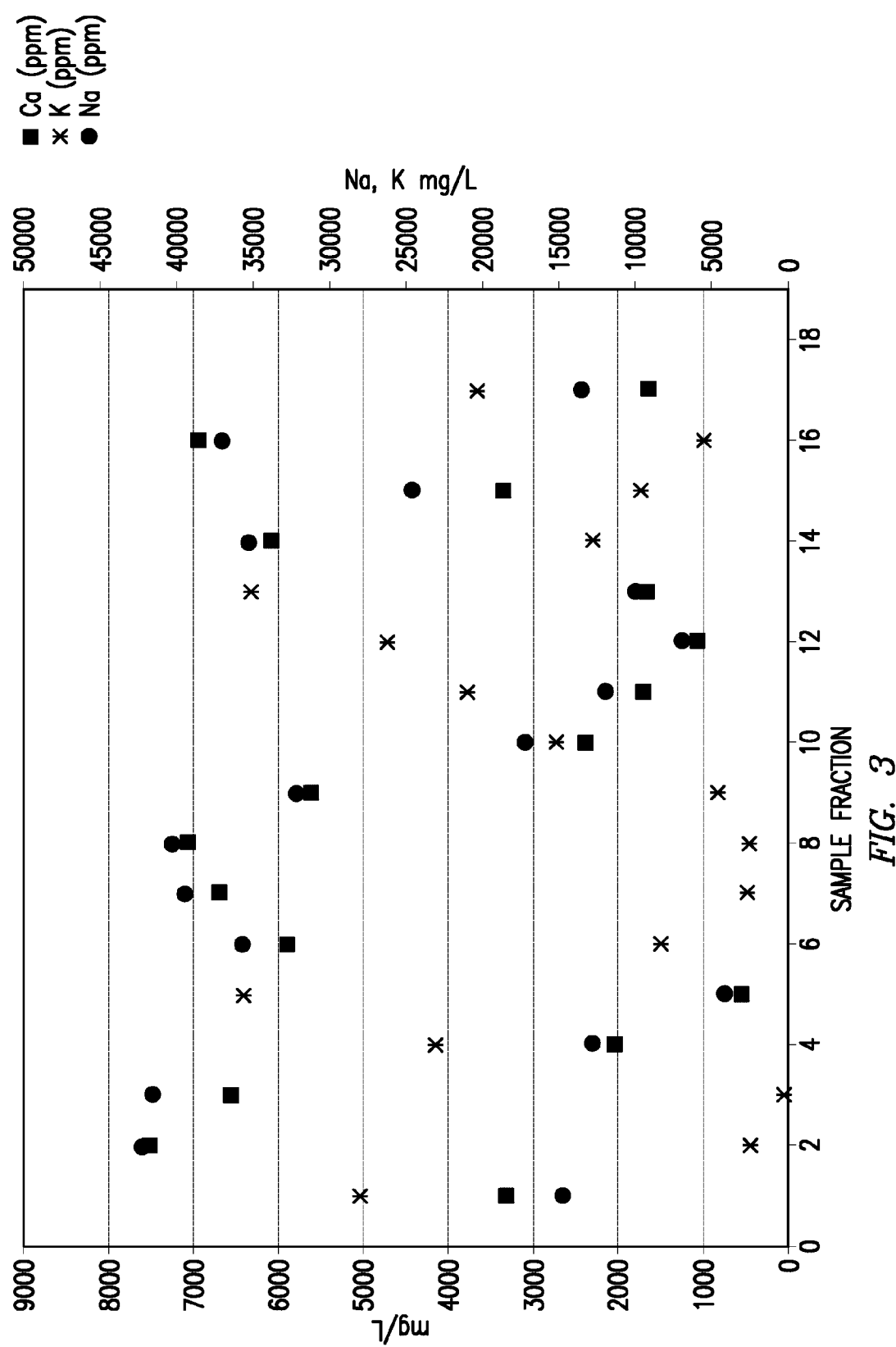

FIGS. 1-3 show illustrative elution plots at 200° F. of a Bandera core eluted with 0.6 M aqueous MGDA (Fluid 1), followed by two applications 0.6 M aqueous MGDA also containing 2% ammonium bifluoride and 5% CLA-WEB™ (Fluid 2). Collected fractions were 15 mL each. As shown in FIG. 1, calcium concentrations remained fairly high, even in the presence of fluoride ions. When only Fluid 1 was present, the aluminum levels were fairly low (~1800 mg/L), whereas when Fluid 2 was applied to the core, concentrations up to 8000 mg/L were obtained (see FIG. 2). As shown in FIG. 3, the levels of dissolved sodium and potassium ions in the elution fractions also remained fairly high, which is consistent with the high porosity obtained from treatment of the core and a substantial lack of precipitation of alkali metal fluorosilicates and fluoroaluminates. Table 3 shows the pH of each elution fraction.

TABLE 3

| Fraction Number | pH |
| --- | --- |
| 1 | 6.38 |
| 2 | 5.58 |
| 3 | 5.32 |
| 4 | 5.8 |
| 5 | 6.01 |
| 6 | 4.94 |
| 7 | 4.57 |
| 8 | 4.58 |
| 9 | 4.7 |
| 10 | 5.16 |
| 11 | 5.3 |
| 12 | 5.4 |
| 13 | 5.56 |
| 14 | 4.76 |
| 15 | 5.01 |
| 16 | 4.55 |
| 17 | 5.24 |

Figure 4:
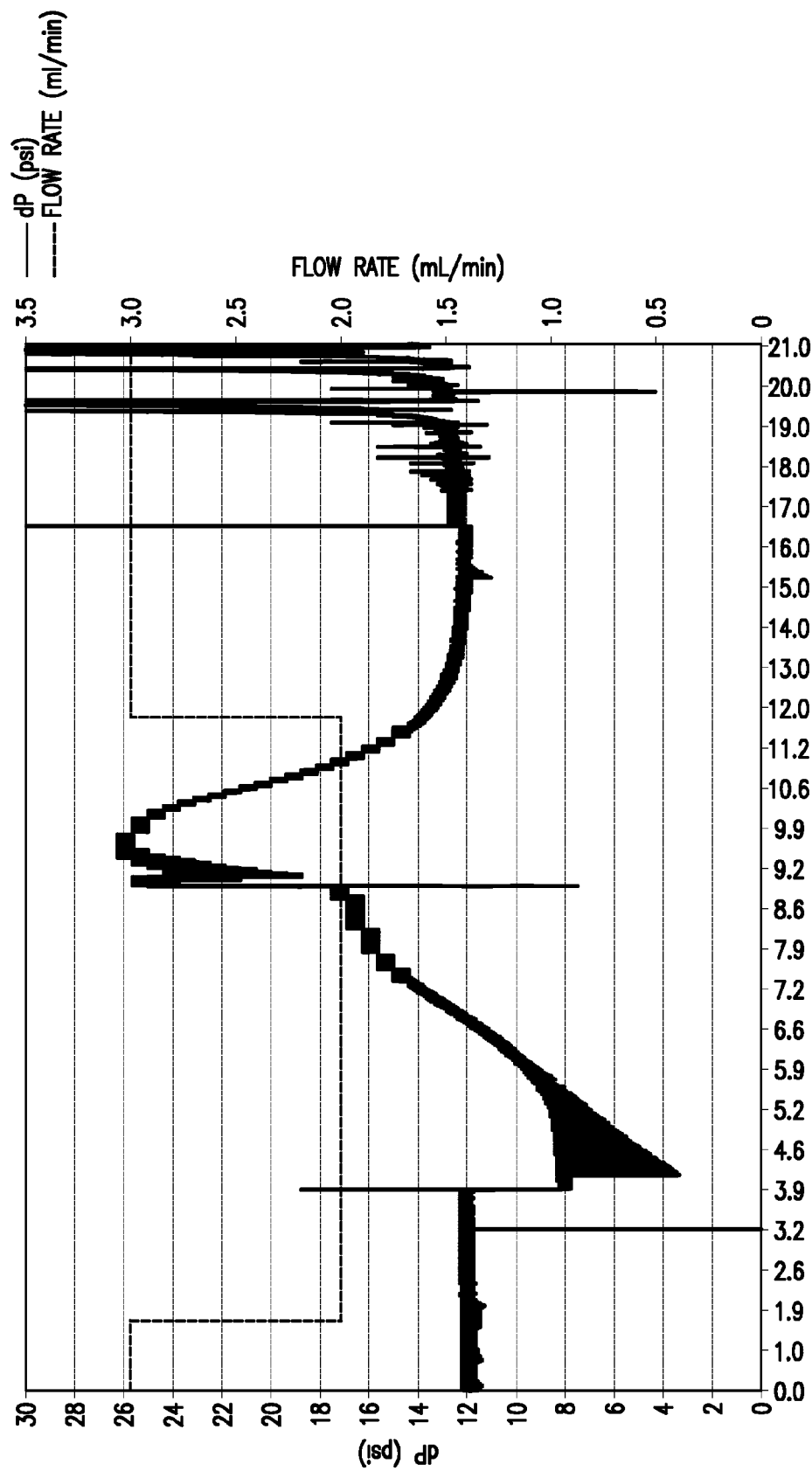
FIGS. 4 and 5 show illustrative plots of differential pressure in the Bandera core sample at 200° F. during the first and second applications of Fluid 2, respectively.
Figure 5:
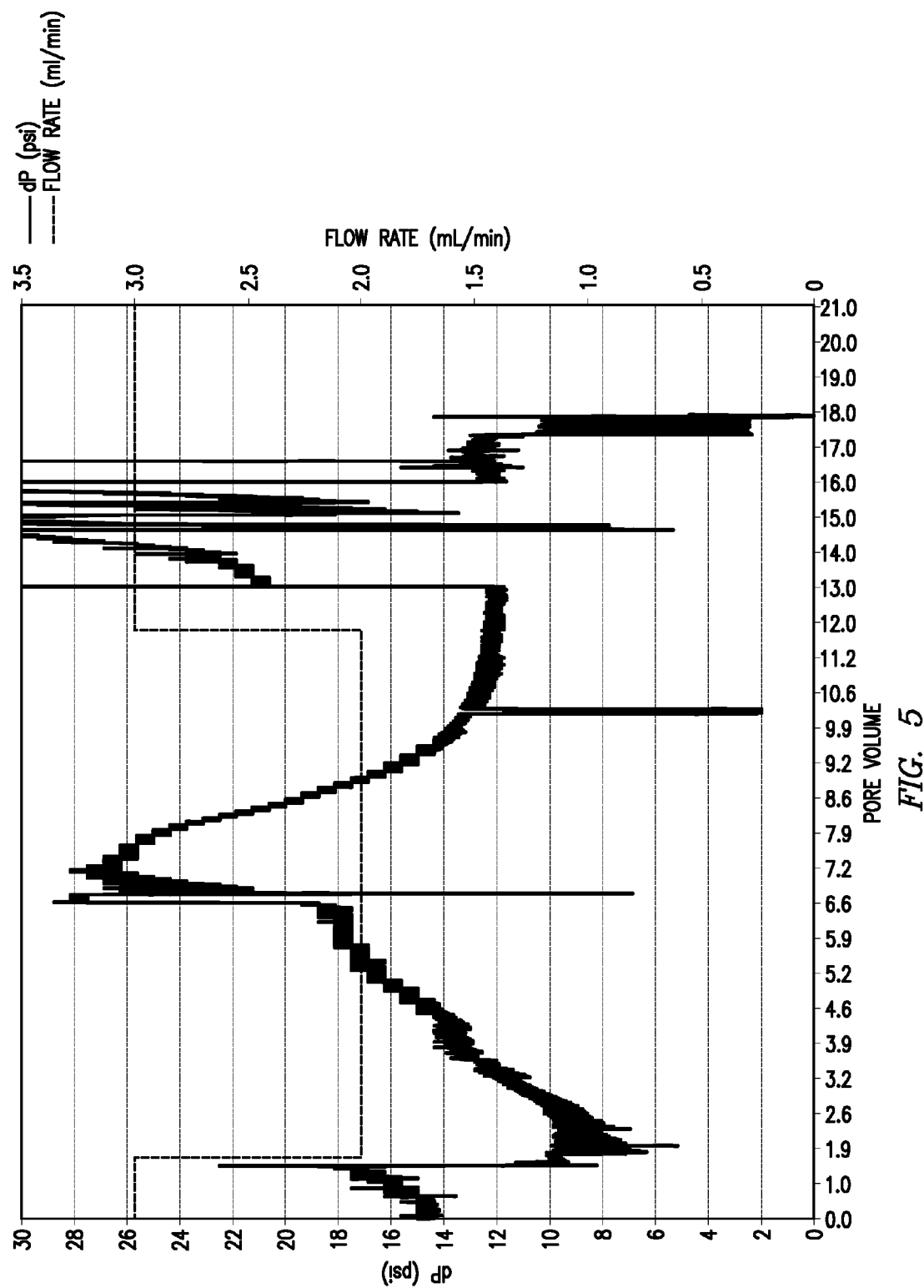

FIGS. 4 and 5 show illustrative plots of differential pressure in the Bandera core sample at 200° F. during the first and second applications of Fluid 2, respectively. The large decreases in differential pressure are consistent with increased permeability resulting from acidization of the core. The permeability relative to the 7% aqueous KCl solution was 1.06 when Fluid 1 was applied to the core. After the first application of Fluid 2, the relative permeability was 0.91. When Fluid 2 was applied to the core a second time, the relative permeability increased to 4.

Example 2: Treatment of a Bandera Core at 200° F. Using MGDA and a Bis-Quaternary Ammonium Compound at Differing MGDA Concentrations In this example, the Bandera core was treated similarly to that in Example 1, except two treatment fluids lacking hydrofluoric acid and containing differing concentrations of MGDA were applied to the core ahead of a single treatment stage containing MGDA, ammonium bifluoride and CLA-WEB™. In this example the first two fluids (Fluids 1 and 2) contained 0.25 M and 0.6 M aqueous MGDA, respectively, each having a pH of 2. The third fluid in this example (Fluid 3) was 0.25 M aqueous MGDA also containing 2% ammonium bifluoride and 5% CLA-WEB™, also having a pH of 2. Fluids 1 and 2 were applied to the core in a combined 10 pore volumes at a flow rate of 2 mL/min. Before application of Fluid 3 to the core, the core was shut in overnight at the test temperature. A pre-flush of 7% aqueous KCl preceded Fluid 1 and a post-flush followed Fluid 3. In addition, 7% aqueous KCl was flushed through the core between Fluids 1 and 2 and between Fluids 2 and 3. The testing conditions, flow rates and flow directions are summarized in Table 4 below.

TABLE 4

| Treatment Stage | Flow Direction | Pore Volumes Applied | Flow Rate (mL/min) |
| --- | --- | --- | --- |
| 7% KCl | Forward | 6 | 3 |
| 7% KCl | Reverse | 5 | 3 |
| Fluid 1 | Reverse | 5 | 2 |
| 7% KCl | Reverse | 5 | 3 |
| 7% KCl | Reverse | 5 | 3 |
| Fluid 2 | Reverse | 5 | 2 |
| 7% KCl | Reverse | 15.5 | 3 |
| 7% KCl | Forward | 3 | 3 |
| 7% KCl | Forward | 2.5 | 3 |
| Fluid 3 | Reverse | 5 | 2 |
| 7% KCl | Reverse | 5 | 3 |
| 7% KCl | Reverse | 1.2 | 5 |
| 7% KCl | Forward | 1.4 | 5 |
| 7% KCl | Forward | 6 | 3 |

Figure 6:
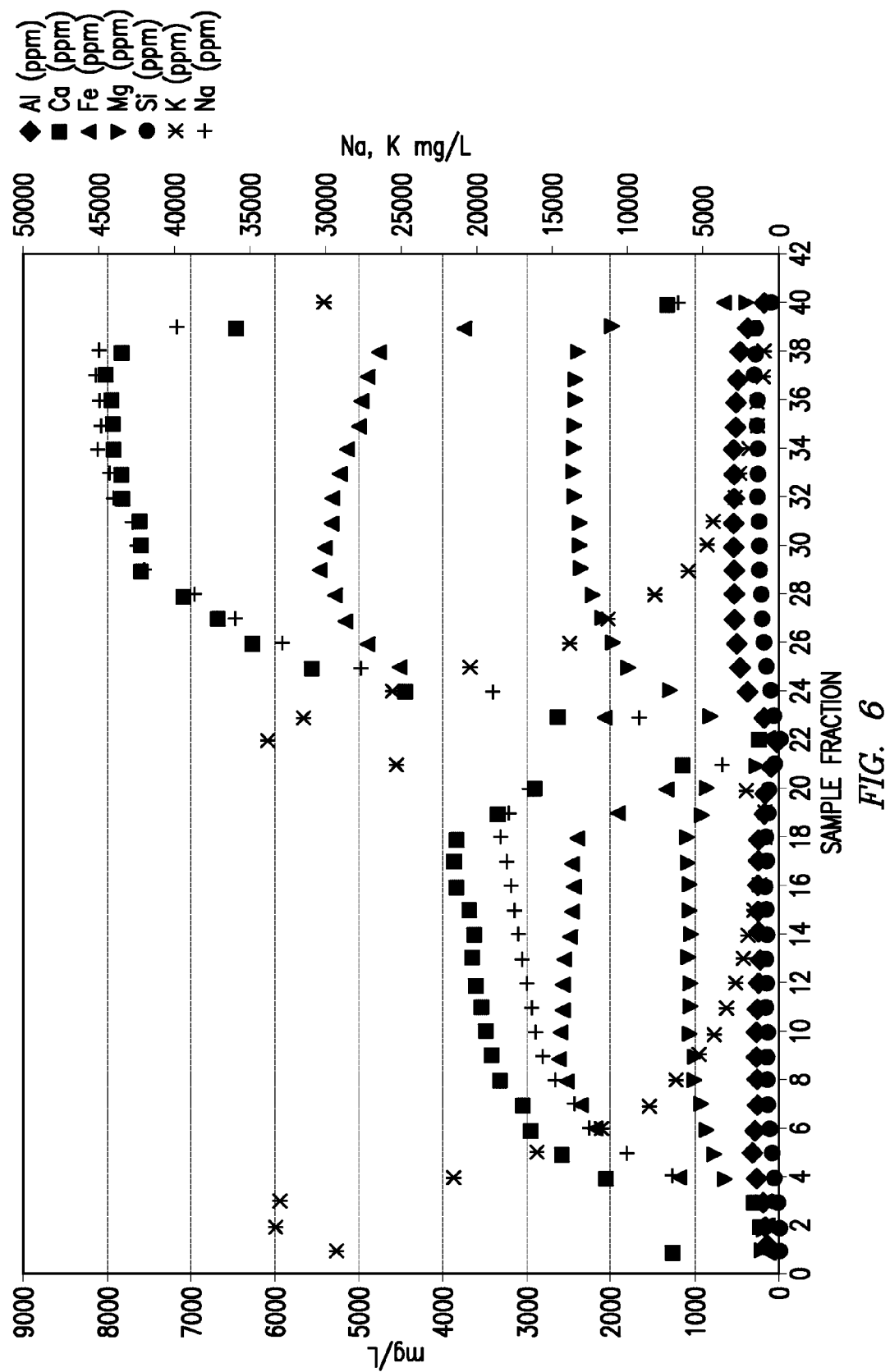
FIGS. 6-8 show illustrative elution plots at 200° F. of a Bandera core eluted with 0.25 M and 0.6 M aqueous MGDA (Fluids 1 and 2), followed by a single application of 0.25 M aqueous MGDA also containing 2% ammonium bifluoride and 5% CLA-WEB™ (Fluid 3).
Figure 7:
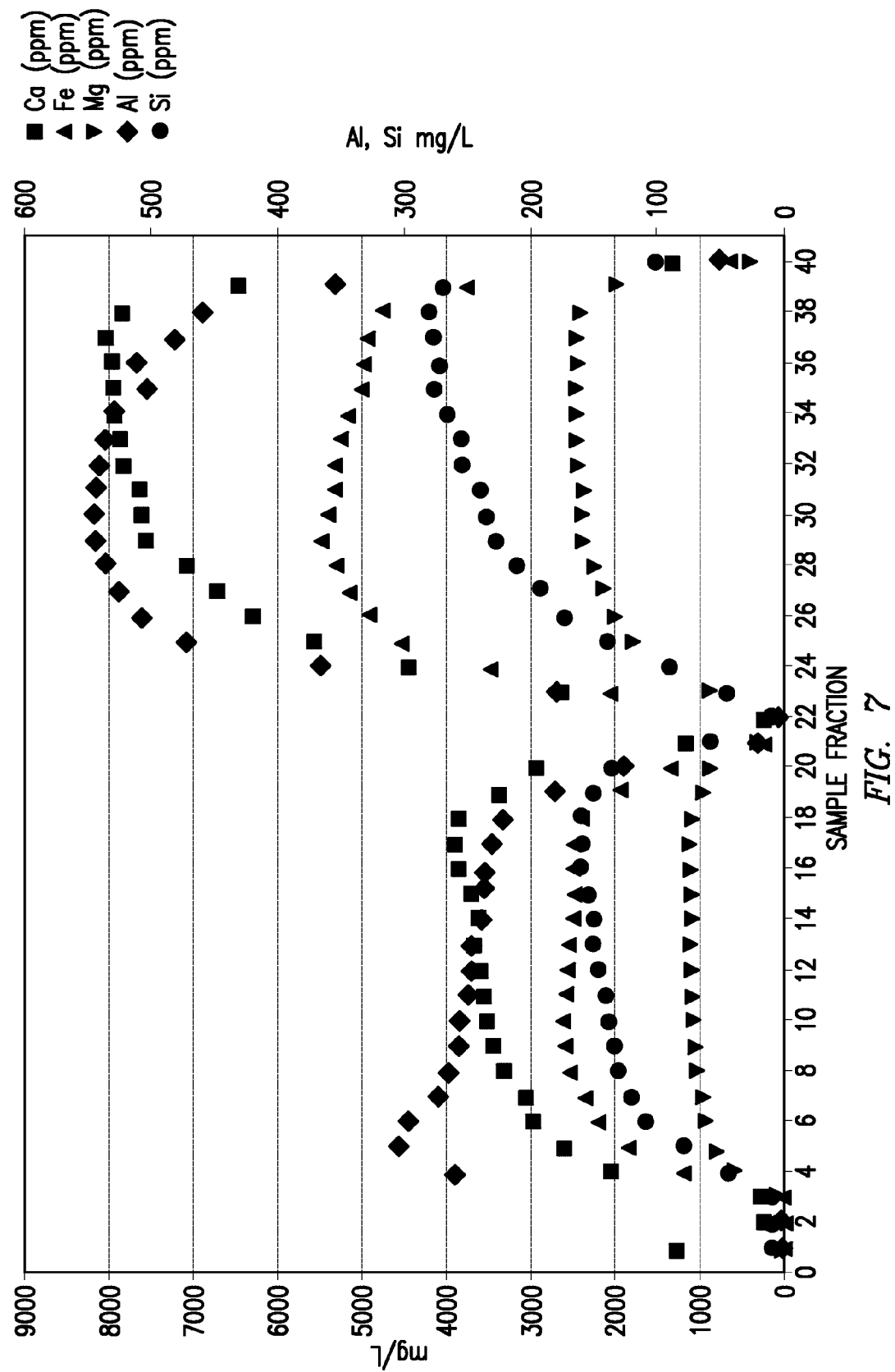
Figure 8:
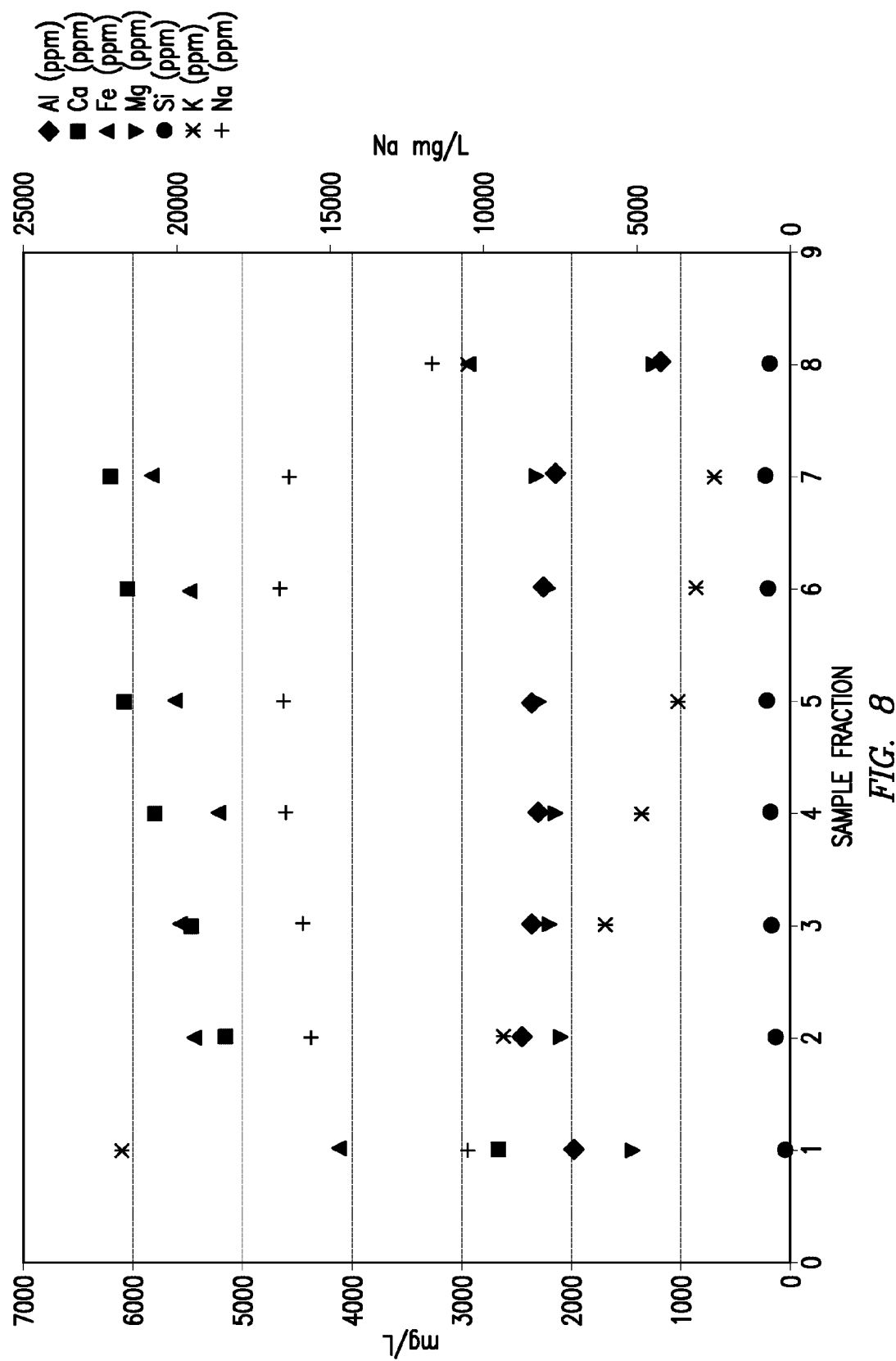

FIGS. 6-8 show illustrative elution plots at 200° F. of a Bandera core eluted with 0.25 M and 0.6 M aqueous MGDA (Fluids 1 and 2), followed by a single application of 0.25 M aqueous MGDA also containing 2% ammonium bifluoride and 5% CLA-WEB™ (Fluid 3). FIGS. 6 and 7 show the elution profile of the core for the application of Fluids 1 and 2, with FIG. 7 simply omitting the monovalent ion analyses of FIG. 6 for purposes of clarity. FIG. 8 shows the elution profile of the core for the application of Fluid 3. As in Example 1, high levels of calcium and aluminum were again obtained. As shown by the application of Fluids 1 and 2 to the core, initial dissolution of the carbonates was affected by the MGDA in the absence of hydrofluoric acid, as evidenced by the high levels of calcium ions. The amount of dissolved calcium increased upon applying Fluid 2 to the core, since it contained a higher concentration of the chelating agent. The calcium levels were maintained once Fluid 3 was applied to the core, indicating that calcium fluoride precipitation did not appear to be problematic. As with Example 1, high levels of aluminum were solubilized once Fluid 3 was applied to the core. Calcium and iron levels also increased once Fluid 3 was applied to the core, which is surprising since the hydrofluoric acid is not anticipated to promote dissolution of these substances. Without being bound by theory or mechanism, it is believed that the CLA-WEB™ further promotes dissolution of calcium and magnesium, relative to the dissolution observed when only the chelating agent is present. Magnesium levels roughly mirrored those of calcium and iron, in an effect known as congruent dissolution. Table 5 shows the eluent pH of each fraction.

TABLE 5

| Fraction Number | pH |
| --- | --- |
| 1 | 4.74 |
| 2 | 7.55 |
| 3 | 7.41 |
| 4 | 7.05 |
| 5 | 6.89 |
| 6 | 6.74 |
| 7 | 6.6 |
| 8 | 6.54 |
| 9 | 6.48 |
| 10 | 6.53 |
| 11 | 6.47 |
| 12 | 6.5 |
| 13 | 6.45 |
| 14 | 6.43 |
| 15 | 6.41 |
| 16 | 6.34 |
| 17 | 6.45 |
| 18 | 6.36 |
| 19 | 6.32 |
| 20 | 6.25 |
| 21 | 6.69 |
| 22 | 7.29 |
| 23 | 6.67 |
| 24 | 6.45 |
| 25 | 6.3 |
| 26 | 6.08 |
| 27 | 6.02 |
| 28 | 5.93 |
| 29 | 5.9 |
| 30 | 5.91 |
| 31 | 5.87 |
| 32 | 5.84 |
| 33 | 5.77 |
| 34 | 5.71 |
| 35 | 5.76 |
| 36 | 5.75 |
| 37 | 5.68 |
| 38 | 5.71 |
| 39 | 5.76 |
| 40 | 6.27 |
| 41 | 5.92 |
| 42 | 5.74 |
| 43 | 5.66 |
| 44 | 5.6 |
| 45 | 5.45 |
| 46 | 5.4 |
| 47 | 5.61 |
| 48 | 5.51 |

The permeability relative to the 7% aqueous KCl solution when Fluid 1 was applied to the core was 1, and when Fluid 2 was applied to the core, the relative permeability was 1.6. When Fluid 3 was applied to the core, the relative permeability increased further to 1.9.

Figure 9:
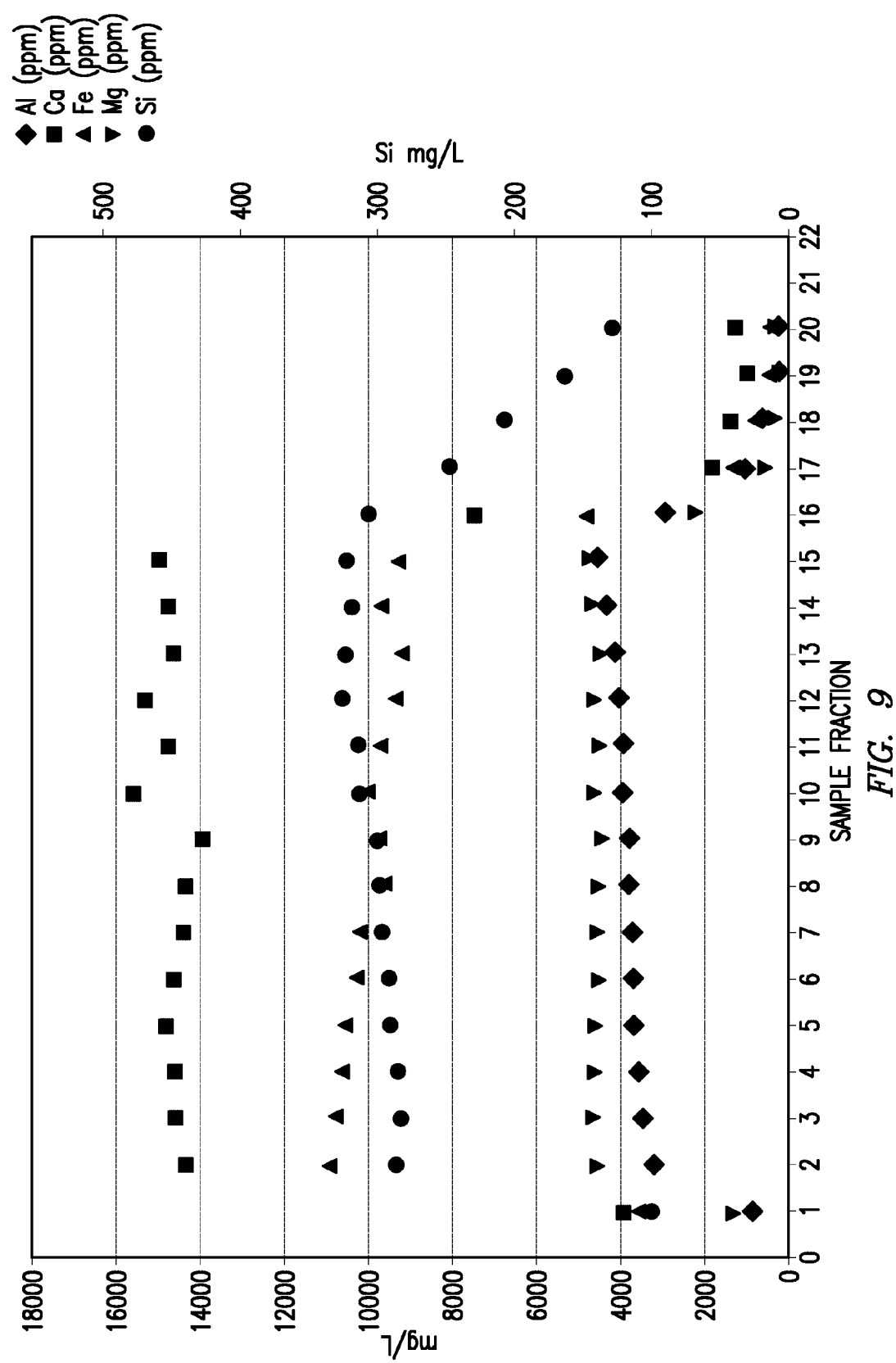
FIG. 9 shows an illustrative elution plot of a Bandera core treated continuously with 0.6 M aqueous MGDA also containing 1.5% ammonium bifluoride and 1% CLA-WEB™ at an elution temperature of 225° F.
Figure 10:
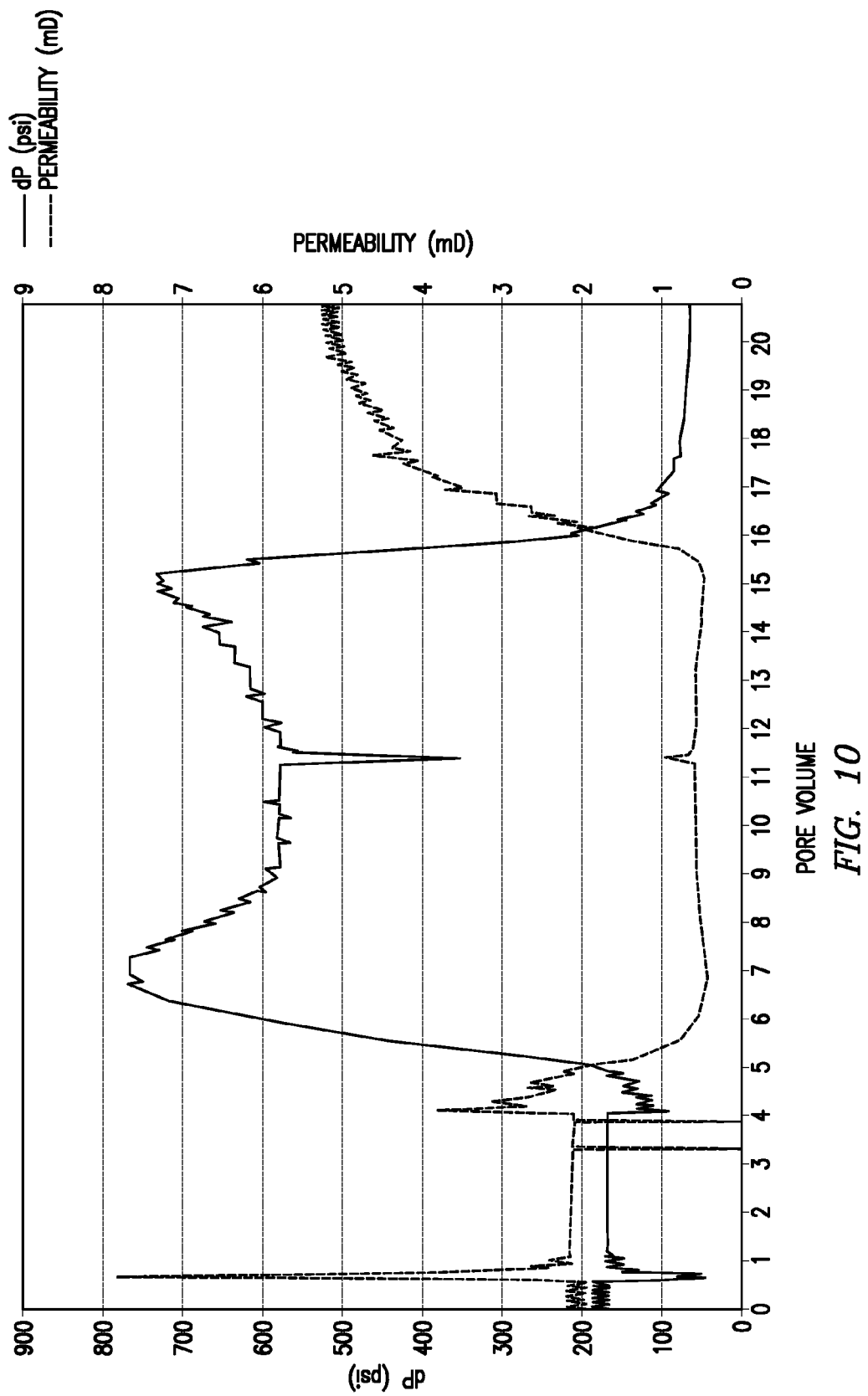
FIG. 10 shows an illustrative plot of differential pressure and permeability for a Bandera core eluted continuously at 225° F. with 0.6 M aqueous MGDA also containing 1.5% ammonium bifluoride and 1% CLA-WEB™.

Example 3: Treatment of a Bandera Core at 225° F. Using Continuous Infusion of MGDA and a Bis-Quaternary Ammonium Compound In this example, the Bandera core was treated similarly to that in Example 1, except the pre- and post-flush fluid was a 3% aqueous KCl solution. The treatment fluid was 0.6 M aqueous MGDA also containing 1.5% ammonium bifluoride, 1% CLA-WEB™ and 0.5% surfactant, having a pH of 2.5. The treatment fluid was continuously infused to the core at a flow rate of 2 mL/min for 10 pore volumes, following a flush with the 3% aqueous KCl solution. FIG. 9 shows an illustrative elution plot of a Bandera core treated continuously with 0.6 M aqueous MGDA also containing 1.5% ammonium bifluoride and 1% CLA-WEB™ at an elution temperature of 225° F. As shown in FIG. 9, high calcium levels were again observed in the eluent fractions. FIG. 10 shows an illustrative plot of differential pressure and permeability for a Bandera core eluted continuously at 225° F. with 0.6 M aqueous MGDA also containing 1.5% ammonium bifluoride and 1% CLA-WEB™. As shown in FIG. 10, application of the treatment fluid resulted in a significant increase in permeability, approximately by a factor of 2.5.

Embodiments disclosed herein include:

A. Methods of acidizing a subterranean formation. The methods involve providing a treatment fluid having a pH ranging between about 1 and about 4.5 and comprising: a chelating agent, hydrofluoric acid or a hydrofluoric acid-generating compound, and a compound having two or more quaternized amine groups; introducing the treatment fluid into a subterranean formation containing a siliceous material and a source of calcium ions; dissolving at least a portion of the siliceous material in the subterranean formation with the hydrofluoric acid or the hydrofluoric acid-generating compound; and complexing at least a portion of the calcium ions in the subterranean formation with the chelating agent.

B. Methods of acidizing a subterranean formation. The methods involve providing a treatment fluid comprising: a chelating agent, hydrofluoric acid or a hydrofluoric acid-generating compound, and a compound having two or more quaternized amine groups; introducing the treatment fluid into a subterranean formation containing a source of calcium ions, wherein the treatment fluid, the subterranean formation, or both contains alkali metal ions; and complexing at least a portion of the calcium ions in the subterranean formation with the chelating agent, without forming a $CaF_2$ precipitate, after introducing the treatment fluid into the subterranean formation.

Each of embodiments A and B may have one or more of the following additional elements in any combination:

Element 1: wherein the source of calcium ions comprises a calcium-containing compound selected from the group consisting of calcite, dolomite, calcium sulfate, calcium chloride, and any combination thereof.

Element 2: wherein the siliceous material comprises silica, quartz, a feldspar, an aluminosilicate, a clay, or any combination thereof.

Element 3: wherein the chelating agent comprises a compound selected from the group consisting of methylglycine diacetic acid, glutamic acid diacetic acid, β-alanine diacetic acid, ethylenediaminedisuccinic acid, any salt thereof, and any combination thereof.

Element 4: wherein the treatment fluid has a pH ranging between about 1 and about 3.

Element 5: wherein a concentration of the chelating agent in the treatment fluid ranges between about 0.1% to about 40% of the treatment fluid by weight.

Element 6: wherein the compound having two or more quaternized amine groups comprises a bis-quaternary ammonium compound.

Element 7: wherein the treatment fluid, the subterranean formation, or both contains alkali metal ions.

Element 8: wherein a concentration of hydrofluoric acid or generated hydrofluoric acid in the treatment fluid ranges between about 0.5% to about 8% of the treatment fluid by weight.

By way of non-limiting example, exemplary combinations applicable to A and B include:

Combination 1: The method of A or B in combination with Elements 1 and 2.

Combination 2: The method of A or B in combination with Elements 1 and 3.

Combination 3: The method of A or B in combination with Elements 1, 2 and 3.

Combination 4: The method of A or B in combination with Elements 1, 2 and 6.

Combination 5: The method of A or B in combination with Elements 1, 3 and 6.

Combination 6: The method of A or B in combination with Elements 1, 2, 3 and 6.

Combination 7: The method of A or B in combination with Elements 1, 2, 6 and 7.

Combination 8: The method of A or B in combination with Elements 1, 3, 6 and 7.

Combination 9: The method of A or B in combination with Elements 1, 2, 3, 6 and 7.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A method comprising:
providing a treatment fluid having a pH ranging between about 1 and about 4.5 and comprising:
an aqueous carrier fluid;
an organic solvent comprising a hydrocarbon;
a chelating agent;
hydrofluoric acid or a hydrofluoric acid-generating compound; and
a compound having two or more quaternized amine groups;
wherein the treatment fluid comprises between about 1 wt. % and about 20 wt. % of the compound having two or more quaternized amine groups;
introducing the treatment fluid into a subterranean formation containing a siliceous material and a source of calcium ions, at least a portion of the siliceous material also comprising aluminum;

dissolving at least a portion of the siliceous material in the subterranean formation with the hydrofluoric acid or the hydrofluoric acid-generating compound, thereby forming dissolved silicon, dissolved aluminum ions and dissolved calcium ions;

exposing the dissolved silicon, the dissolved aluminum ions and the dissolved calcium ions to the compound having two or more quaternized amine groups; and while exposing the compound having two or more quaternized amine groups to the dissolved silicon, the dissolved aluminum ions, and the dissolved calcium ions, complexing both the dissolved calcium ions and the dissolved aluminum ions with the chelating agent, wherein the compound having two or more quaternized amine groups comprises a bis-quaternary ammonium compound, wherein the bis-quaternary ammonium compound has a structure of

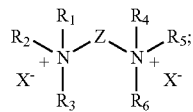

wherein $X^-$ is an anion and Z comprises a linker moiety selected from the group consisting of —$CH(R_7)CH_2$—, —$CH(OR_7)CH_2$—, —$CH(NR_7R_8)CH_2$—, —$CH(R_7)CH_2CH_2$—, —$CH_2CH(R_7)CH_2$—, —$CH(OR_7)CH_2CH_2$—, —$CH(NR_7R_8)CH_2CH_2$—, —$CH_2CH(OR_7)CH_2$—, and —$CH_2CH(NR_7R_8)CH_2$—;

wherein $R_1$-$R_6$ are each alkyl, aryl, or cycloalkyl groups containing 1 to about 20 carbon atoms; and wherein $R_7$ and $R_8$ are H or alkyl, aryl, or cycloalkyl groups containing 1 to about 20 carbon atoms, wherein the anion is selected from the group consisting of fluoride, chloride, bromide, iodide, organic anions, sulfate, and nitrate.

2. The method of claim 1, wherein the source of calcium ions comprises a calcium-containing compound selected from the group consisting of calcite, dolomite, calcium sulfate, calcium chloride, and any combination thereof.

3. The method of claim 1, wherein the siliceous material comprises silica, quartz, a feldspar, an aluminosilicate, a clay, or any combination thereof.

4. The method of claim 1, wherein the chelating agent comprises a compound selected from the group consisting of methylglycine diacetic acid, glutamic acid diacetic acid, β-alanine diacetic acid, ethylenediaminedisuccinic acid, any salt thereof, and any combination thereof.

5. The method of claim 1, wherein the treatment fluid has a pH ranging between about 1 and about 3.

6. The method of claim 1, wherein a concentration of the chelating agent in the treatment fluid ranges between about 0.1% to about 40% of the treatment fluid by weight.

7. The method of claim 1, wherein the treatment fluid, the subterranean formation, or both contains alkali metal ions.

8. The method of claim 7, wherein the treatment fluid comprises an alkali metal salt of the chelating agent.

9. The method of claim 1, wherein a concentration of hydrofluoric acid or generated hydrofluoric acid in the treatment fluid ranges between about 0.5% to about 8% of the treatment fluid by weight.

10. The method of claim 1, wherein a $CaF_2$ precipitate is not formed upon introducing the treatment fluid into the subterranean formation.

* * * * *